United States Patent
Jang et al.

(10) Patent No.: US 10,819,588 B2
(45) Date of Patent: Oct. 27, 2020

(54) METHOD FOR AUTO-SCALING OF WEB SERVER AND WEB APPLICATION SERVER AND WAS ADMINISTRATING SERVER USING THE SAME

(71) Applicant: TMAXSOFT. CO., LTD., Gyeonggi-do (KR)

(72) Inventors: Young Hwi Jang, Seoul (KR); Sung Bae Yoon, Gyeonggi-do (KR); Hee Jin Lee, Seoul (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 128 days.

(21) Appl. No.: 16/006,947

(22) Filed: Jun. 13, 2018

(65) Prior Publication Data

US 2019/0363955 A1    Nov. 28, 2019

(30) Foreign Application Priority Data

May 24, 2018    (KR) ........................ 10-2018-0059188

(51) Int. Cl.
*H04L 12/24*     (2006.01)
*H04L 29/08*     (2006.01)

(52) U.S. Cl.
CPC .......... *H04L 41/5054* (2013.01); *H04L 67/02* (2013.01); *H04L 67/1031* (2013.01); *H04L 67/141* (2013.01); *H04L 67/16* (2013.01)

(58) Field of Classification Search
CPC ... H04L 41/5054; H04L 67/02; H04L 67/141; H04L 67/1031; H04L 67/16
See application file for complete search history.

(56) References Cited

U.S. PATENT DOCUMENTS

| 2006/0075112 A1* | 4/2006 | Polozoff | H04L 65/1066 709/227 |
| 2007/0204030 A1* | 8/2007 | Mimura | G06F 9/505 709/223 |
| 2015/0347170 A1* | 12/2015 | Mohammed | G06F 8/65 718/1 |
| 2018/0321961 A1* | 11/2018 | Gunda | G06F 9/45545 |

FOREIGN PATENT DOCUMENTS

| KR | 1020130010248 A | 1/2013 |
| KR | 1020150079422 A | 7/2015 |

* cited by examiner

*Primary Examiner* — Nam T Tran
*Assistant Examiner* — Lam H Duong
(74) *Attorney, Agent, or Firm* — Husch Blackwell LLP

(57) ABSTRACT

A method for auto-scaling at least one web server and at least one WAS (Web Application Server) is provided. The method includes a WAS administrating server grouping, as a first service group, both at least one first web server and at least one first WAS, which are connected with each other to provide a first application service, and grouping, as a second service group, both at least one second web server and at least one second WAS, which are connected with each other to provide a second application service, to thereby create at least two groups each of which includes at least its corresponding pair of web server and WAS, and the WAS administrating server allowing each of the grouped pairs of the web servers and the WAS's to be scaled out or scaled in, independently, by a process of scaling-out or scaling-in.

12 Claims, 4 Drawing Sheets

METHOD FOR AUTO-SCALING OF WEB SERVER AND WEB APPLICATION SERVER AND WAS ADMINISTRATING SERVER USING THE SAME

CROSS REFERENCE TO RELATED APPLICATION

This application claims priority to and incorporates herein by reference all disclosure in Korean patent application no. 10-2018-0059188 filed May 24, 2018.

FIELD OF THE INVENTION

The present invention relates to a method for auto-scaling of a web server and a web application server, and more particularly, to the method for auto-scaling at least one web server and at least one WAS (Web Application Server), including steps of: (a) a WAS administrating server, while managing multiple WAS's and communicating with multiple web servers to allow at least one session for providing at least one application service to be shared, grouping, as a first service group, both at least one first web server and at least one first WAS, which are connected with each other to provide a first application service, and grouping, as a second service group, both at least one second web server and at least one second WAS, which are connected with each other to provide a second application service, to thereby create at least two groups each of which includes at least its corresponding pair of web server and WAS, wherein the first WAS and the second WAS are selected among the multiple WAS's managed by the WAS administrating server and wherein the first web server and the second web server are selected among the multiple web servers communicating with the multiple WAS's, and (b) the WAS administrating server allowing each of the grouped pairs of the web servers and the WAS's to be scaled out or scaled in, independently, by a process of scaling-out or scaling-in, and the WAS administrating server using the same.

BACKGROUND OF THE INVENTION

A web server means a server which receives a Hyper-Text Transfer Protocol (HTTP) request from a client, i.e., an entity requesting a worldwide web (referred to as the "web") service, and provides, to the client, a response to the HTTP request, e.g., a content such as a webpage, etc. In addition, a web application server, i.e., WAS, means a software engine, which runs an application on a client through HTTP over a network, or hardware including it.

In an environment where web servers and WAS's are provided, if the web servers are connected to the WAS's, configurations of the web servers and the WAS's, generally, must be predetermined and set up accordingly.

For such connections, as one example, the web servers are connected to the WAS's through TCP connections in a proxy scheme, and then deliver HTTP requests and receive responses thereto.

As another example, a WAS administrating server (which may be selected among a plurality of WAS's) manages TCP connections between the web servers and the WAS's.

FIG. 1 represents existing WAS administrating servers which manage connections between web servers and WAS's.

By referring to FIG. 1, a first WAS administrating server 100 manages a TCP connection between a first web server 101 for a first application service and a first WAS 102 for the first application service and a second WAS administrating server 110 manages a TCP connection between a second web server 111 for a second application service and a second WAS 112 for the second application service.

In a configuration such as FIG. 1, the first web server 101 processes a static file in the first application and a first WAS 102 processes a dynamic file in the first application. The second web server 111 processes a static file in the second application and a second WAS 112 processes a dynamic file in the second application.

As shown in FIG. 1, because the two individual WAS administrating servers are required to serve the two applications, the WAS administrating servers 100 and 110 additionally manage new web servers or new WAS's, prepared as a result of a process of scaling-out, to provide the corresponding application services. Further, for a new application service, a new WAS administrating server should be added to manage one or more new web servers and one or more new WAS's that provide the new application service.

Meanwhile, if the web server 101 and the WAS 102 connecting with each other serve only one application, one or more new web servers or one or more new WAS's added as a result of scaling-out may use the existing connection or the existing session established between the web server 101 and the WAS 102.

However, it is difficult to share one session between two applications if the two separate WAS administrating servers are provided as shown in FIG. 1.

FIG. 2 illustrates a configuration of an existing WAS administrating server connecting web servers and WAS's that provide multiple application services.

By referring to FIG. 2, one WAS administrating server 200 manages a TCP connection and sharing of a session among a first web server 201 that provides a first application service, and a second web server 211 that provides a second application service and a first WAS 202 that provides the first application service and a second WAS 212 that provides the second application service.

In configuration of FIG. 2, since two or more application services should be tied as one domain, the one WAS administrating server 200 allows the session of the multiple application services to be shared.

However, in the configuration as shown in FIG. 2, if at least either of a first group including the web server 201 and the WAS 202 or a second group including the web server 211 and the WAS 212 is scaled out, it is difficult to determine which application service a newly added web server or a newly added WAS should provide or which TCP connection they must use.

SUMMARY OF THE INVENTION

It is an object of the present invention to solve all problems explained above.

It is another object of the present invention to provide a function of auto-scaling without a separation of a domain or without an addition of a new WAS administrating server while providing two or more application services.

In accordance with one aspect of the present invention, there is provided a method for auto-scaling at least one web server and at least one WAS (Web Application Server), including steps of: (a) a WAS administrating server, while managing multiple WAS's and communicating with multiple web servers to allow at least one session for providing at least one application service to be shared, grouping, as a first service group, both at least one first web server and at least one first WAS, which are connected with each other to provide a first application service, and grouping, as a second service group, both at least one second web server and at least one second WAS, which are connected with each other to provide a second application service, to thereby create at least two groups each of which includes at least its corresponding pair of web server and WAS, wherein the first WAS and the second WAS are selected among the multiple WAS's managed by the WAS administrating server and wherein the first web server and the second web server are selected among the multiple web servers communicating with the multiple WAS's, and (b) the WAS administrating server allowing each of the grouped pairs of the web servers and the WAS's to be scaled out or scaled in, independently, by a process of scaling-out or scaling-in.

In accordance with another aspect of the present invention, there is provided a WAS (Web Application Server) administrating server including: a communication part for transmitting and receiving data to and from at least one web server and the at least one WAS; and a processor, (I) while managing multiple WAS's and communicating with multiple web servers to allow at least one session for providing at least one application service to be shared, grouping, as a first service group, both at least one first web server and at least one first WAS, which are connected with each other to provide a first application service, and grouping, as a second service group, both at least one second web server and at least one second WAS, which are connected with each other to provide a second application service, to thereby create at least two groups each of which includes at least its corresponding pair of web server and WAS, wherein the first WAS and the second WAS are selected among the multiple WAS's managed by the WAS administrating server and wherein the first web server and the second web server are selected among the multiple web servers communicating with the multiple WAS's; and (II) the WAS administrating server allowing each of the grouped pairs of the web servers and the WAS's to be scaled out or scaled in, independently, by a process of scaling-out or scaling-in.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Figure 1:
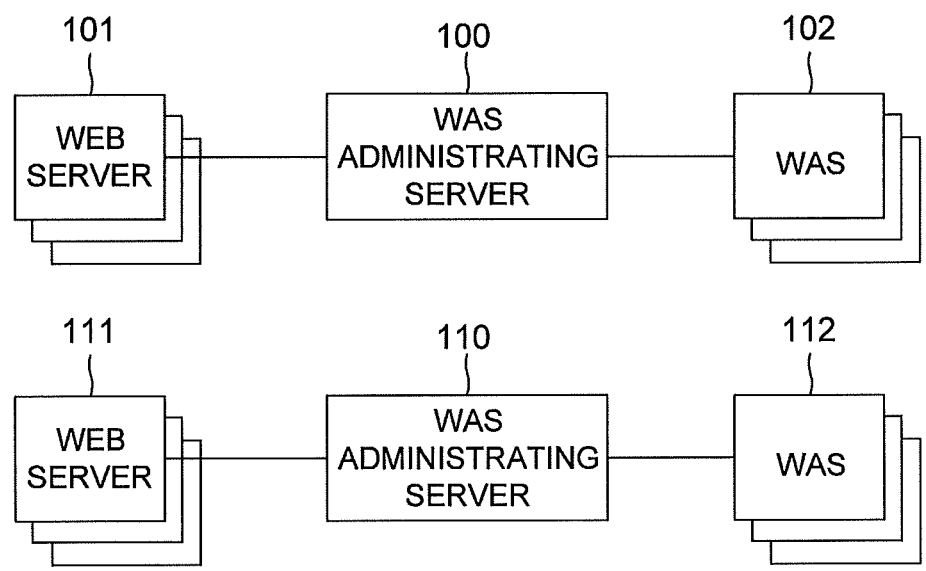
FIG. 1 represents a method for configuring connections between web servers and WAS's by using existing WAS administrating servers.
Figure 2:
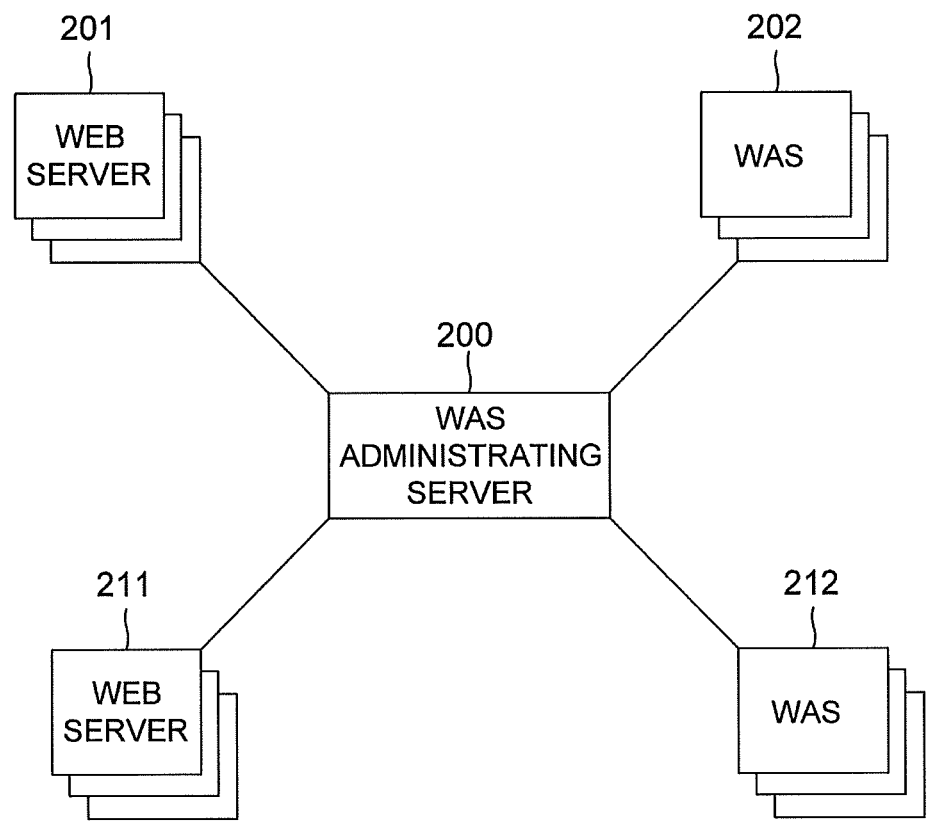
FIG. 2 illustrates a method for connecting web servers and WAS's that provide multiple application services by using an existing WAS administrating server.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

Figure 3:
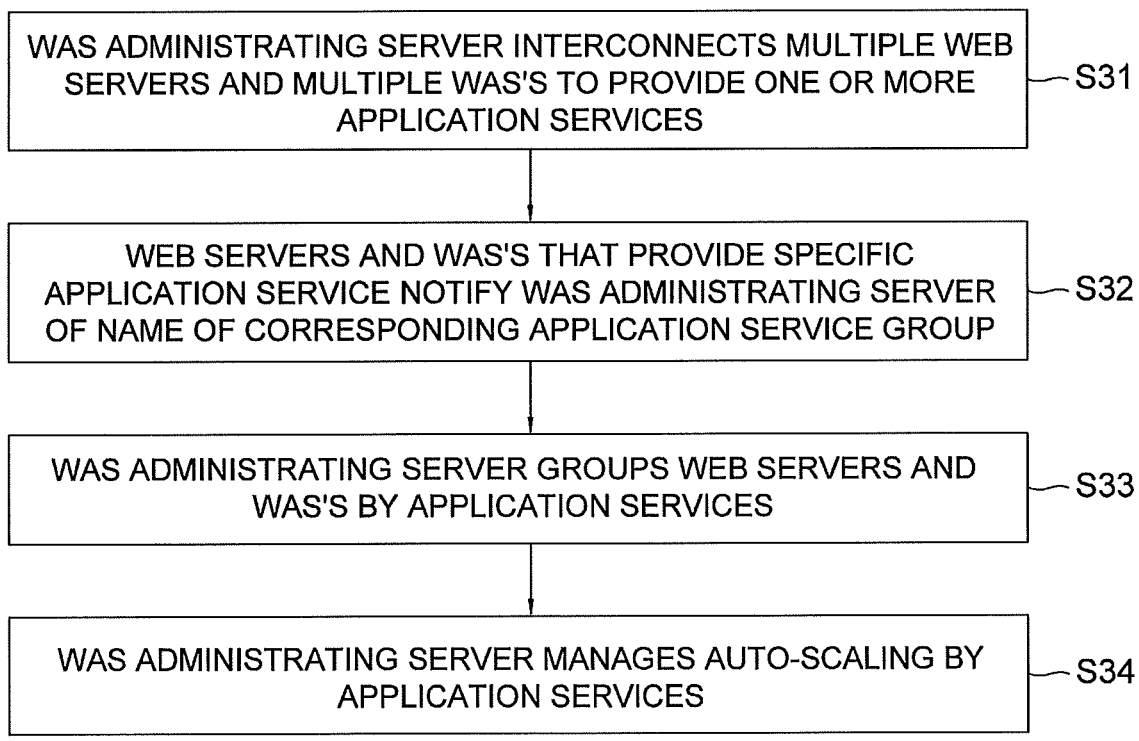
FIG. 3 is a flowchart illustrating a method for a WAS administrating sever supporting web servers and WAS's to be scaled out while providing multiple application services in a cloud environment in accordance with the present invention.
Figure 4:
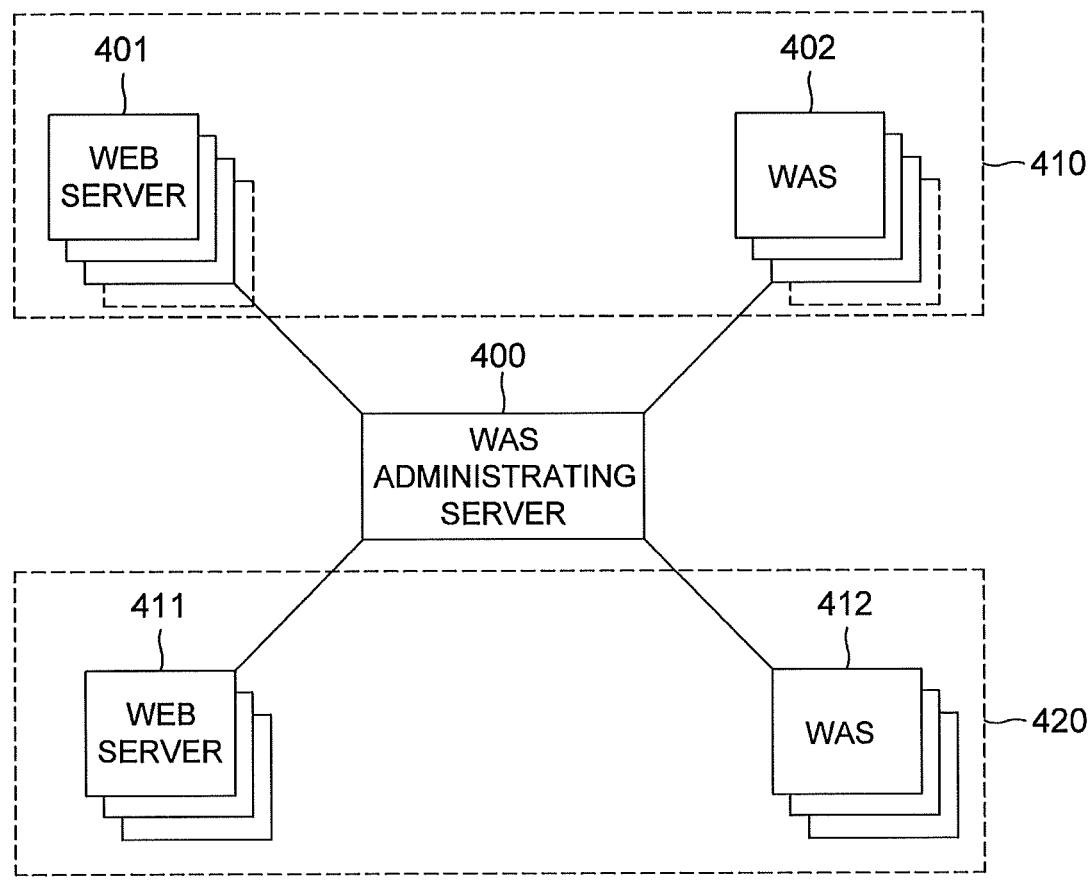
FIG. 4 represents a configuration of a system supporting auto-scaling of the web servers and the WAS' while providing multiple application services in a cloud environment in accordance with the present invention.

FIG. 3 is a flowchart illustrating a method for a WAS administrating sever supporting web servers and WAS's to be scaled out while providing multiple application services in a cloud environment in accordance with the present invention and FIG. 4 represents a configuration of a system supporting auto-scaling of the web servers and the WAS's while providing multiple application services in a cloud environment in accordance with the present invention.

A WAS administrating server 400 in accordance with the present invention manages multiple WAS's and communicates with multiple web servers to allow the session for providing application services to be shared among the WAS's and the web servers.

By referring to FIGS. 3 and 4, the WAS administrating server 400 interconnects at least one first web server 401 and at least one first WAS 402 that provide a first application service and interconnects at least one second web server 411 and at least one second WAS 412 that provide a second application service at a step of S31.

The WAS administrating server 400 may include a communicating part and a processor (not illustrated). The communicating part of the WAS administrating server 400 transmits and receives various data with the multiple web servers and the multiple WAS's. Meanwhile, if one or more new web servers other than the multiple existing web servers or one or more new WAS's other than the multiple existing WAS's are prepared, the communicating part may also perform a function of receiving connection states of the new web servers or the new WAS's. In addition, the processor of the WAS administrating server 400 performs functions of providing a group management service for the WAS's and another group management services for the web servers and the WAS's capable of providing individual application services. Herein, the multiple WAS's include the first WAS 402 and the second WAS 412 in FIG. 4 and the multiple web servers include at least the first web server 401 and the second web server 411 in FIG. 4.

In addition, by referring to FIG. 3, the individual web servers 401 and the individual WAS's 402 that provide the first application service notify the WAS administrating server 400 of a name of a first application service group 410 and the individual web servers 411 and the individual WAS's 412 that provide the second application service notify the WAS administrating server 400 of a name of a second application group 420 at a step of S32, the WAS administrating server 400 groups the web servers 401 and the WAS's 402 capable of providing the first application service as the first service group 410 and groups the web servers 411 and the WAS's 412 capable of providing the second application service as the second service group 420 at a step of S33.

By referring to FIG. 4, among the multiple WAS's and the multiple web servers, the WAS administrating server 400 in accordance with the present invention groups the at least one first web server 401 and the at least one first WAS 402, which share their connection for the first application service, and groups the at least one second web server 411 and the at least one second WAS 412, which share their connection for the second application service, to thereby create at least two groups, i.e., the first service group 410 and the second service group 420, each of which includes at least its corresponding pair of web server(s) and WAS(s). Herein, each of the first web server 401, the first WAS 402, the second web server 411, and the second WAS 412 is not limited to refer to one web server or one WAS but may refer to multiple web servers or multiple WAS's.

If the WAS administrating server 400 manages connections between other web servers and other WAS's that provide other multiple application services other than the first application service and the second application service, the WAS administrating server 400 can also group said other web servers and said other WAS's by said other application services.

As such, the WAS administrating server 400 may manage scale-out processes by the individual application services by grouping the web servers and the WAS's by the individual application services at a step of S34. In other words, the WAS administrating server 400 allows each of the grouped pairs of the web servers and the WAS's to be scaled out or scaled in, independently.

In short, as shown in FIG. 4, if load of the first web servers 401 or the first WAS's 402 included in the first service group 410 exceeds a predetermined threshold, the WAS administrating server 400 may allow the first web servers 401 and/or the first WAS's 402 to be scaled out. If one or more new web servers and one or more new WAS's are added as a result of the scaling-out process, the WAS administrating server 400 manages the individual new web servers and the individual new WAS's as the first service group.

For example, on condition that the WAS administrating server 400 has connected each corresponding WAS and each corresponding web server that provide each of individual application services through each TCP connection and has grouped said each corresponding WAS and said each corresponding web server by each of the individual application services, the WAS administrating server 400 can connect each of the new web servers and each of the new WAS's, provided as a result of scaling-out, through each of the individual TCP connections by each of the individual application services.

Putting a course of such TCP connections specifically, if the new web servers or the new WAS's prepared for the first application service notify the WAS administrating server 400 of the name of their own service group, i.e., the first application service, the WAS administrating server 400 manages the new web servers or the new WAS's in the first service group 410 and if the new web servers or the new WAS's prepared for the second application service notify the WAS administrating server 400 of the name of their own service group, i.e., the second application service, the WAS administrating server 400 manages the new web servers or the new WAS's in the second service group 420. In addition, if the new web servers or the new WAS's prepared for other application services notify the WAS administrating server 400 of names of their corresponding service groups, i.e., said other application services (not illustrated), the WAS administrating server 400 can manage the new web servers or the new WAS's in said other service groups.

Herein, the WAS administrating server 400 allows the web servers and the WAS's to share their information with each other within the first service group 410, the second service group 420, or said other service groups, respectively.

If a scaling-out or a scaling-in is required for the first service group corresponding to the first application service, the number of the web servers and/or the WAS's corresponding to the first application service may be increased or decreased; and if a scaling-out or a scaling-in is required for the second service group corresponding to the second application service, the number of the web servers and/or the WAS's corresponding to the second application service may be increased or decreased. Similarly, if a scaling-out or a scaling-in is required for said other service groups corresponding to said other application services, the WAS administrating server 400 increases or decreases the number of the WAS's and/or the web servers within said other service groups corresponding to said other application services.

In FIG. 4, the WAS administrating server 400 may allow the session to be shared between the WAS's in the first service group 410 and those in the second service group 420. In other words, the WAS administrating server 400 in accordance with the present invention may allow the session to be shared by making a domain between at least two applications shared and making their connection information shared among the WAS's in different service groups.

By the way, the processor of the WAS administrating server 400 in accordance with the present invention may further perform processes of detecting and managing change in at least some of connection state of the existing WAS's, the new WAS's, the existing web servers, and the new web servers by the individual service groups.

In accordance with one example embodiment of the present invention, if a domain is initially set up for the web servers and the WAS's, the WAS administrating server 400 may be set up. Then, a server newly provided in the domain may be added as a WAS managed server, i.e., a WAS. Further, in an environment under which web servers are dynamically added or removed, the WAS administrating server 400 receives such information on dynamic changes and delivers the information to both the web servers and the WAS's. In other words, while the WAS administrating server 400 manages the multiple existing WAS's and communicates with the multiple existing web servers, if a new web server other than the multiple existing web servers is provided, the WAS administrating server 400 may receive a connection state of the new web server and deliver the connection state of the new web server to the multiple existing WAS's and the multiple existing web servers. Herein, the WAS administrating server 400 may deliver the connection state even to the new web server. This process may be applied even in an example of the newly provided WAS.

In accordance with the present invention, in FIG. 4 where the WAS administrating server 400 is configured to manage the first application service and the second application service, upon a new addition of a third application service or upon an increase in either of the number of web servers or that of WAS's corresponding to the third application service as a result of scaling-out, the WAS administrating server 400 may manage the individual web servers and the individual WAS's within the first application service, the second application service, and the third application service, respectively, without an addition of a new WAS administrating server for managing the third application service.

Besides, in accordance with the present invention, a function of auto-scaling is supported in the system including the web servers and the WAS's in a cloud environment while keeping a configuration of the system capable of sharing the domain with each other. Thus, the session may be allowed to be shared without separating the domain by several application services while keeping the configuration of connections between the web servers and the WAS's.

The present invention has an effect of providing a function of auto-scaling in the system including the web servers and the WAS's in the cloud environment, while providing the multiple application services and keeping the configuration of the system capable of sharing the domain with each other.

The present invention has another effect of providing a session to be shared without separating the domain by several application services while keeping the configuration of connections between the web servers and the WAS's in the cloud environment.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for auto-scaling at least one web server and at least one WAS (Web Application Server) in an environment, comprising steps of:
   (a) a WAS administrating server, while managing multiple WAS's and communicating with multiple web servers to allow at least one session for providing at least one application service to be shared, grouping, as a first service group, both at least one first web server and at least one first WAS, which are connected with each other to provide a first application service, and grouping, as a second service group, both at least one second web server and at least one second WAS, which are connected with each other to provide a second application service, to thereby create at least two groups each of which includes at least its corresponding pair of web server and WAS, wherein the first WAS and the second WAS are selected among the multiple WAS's managed by the WAS administrating server and wherein the first web server and the second web server are selected among the multiple web servers communicating with the multiple WAS's; and
   (b) the WAS administrating server allowing each of the grouped pairs of the web servers and the WAS's to be scaled out or scaled in, independently, by a process of scaling-out or scaling-in;
   wherein, at the step of (a), on condition that the respective WAS's and the respective web servers that provide individual application services are matched through their corresponding TCP connections, the WAS administrating server groups the respective WAS's and the respective web servers by the individual application services; and
   wherein, at the step of (b), the WAS administrating server matches individual new web servers and individual new WAS's, prepared as a result of the process of scaling-out, by the individual application services through the individual TCP connections corresponding to the individual application services;
   wherein, at the step of (a), the WAS administrating server acquires names of the individual service groups from the individual WAS's and the individual web servers capable of providing the first application service and second application service, thereby grouping them as the first service group and the second service group, respectively; and
   wherein, at the step of (b), the WAS administrating server receives notifications from individual new web servers or individual new WAS's, prepared as a result of the process of scaling-out, of names of corresponding service groups of the individual new web servers or individual new WAS's, to thereby manage the individual new web servers or the individual new WAS's, respectively, in the first service group and the second service group and allow respective information to be shared only within the first application service group and the second application service group, respectively.

2. The method of claim 1, wherein, at the step of (a), the WAS administrating server creates the at least two groups by applying grouping processes to at least part of all web servers and all WAS's managed by the WAS administrating server, by individual application services.

3. The method of claim 1, wherein, at the step of (b), if a process of scaling-out or scaling-in with respect to a specific group corresponding to a specific application service selected from either of the first application service and the second application service is required, the WAS administrating server increases or reduces the number of at least some of WAS's and web servers in the specific group corresponding to the specific application service.

4. The method of Claim 1, wherein, at the step of (b), the WAS administrating server allows WAS's included in the first service group and those in the second service group to share their connection information with each other to thereby allow the session to be shared.

5. The method of claim 1, wherein, if at least one of conditions are met, wherein the conditions include: (i) a first condition that a third application service is added as a new application, (ii) a second condition that the number of existing web servers or the number of new web servers corresponding to the third application service is increased, and (iii) a third condition that the number of the existing WAS's or the number of the new WAS's corresponding to the third application service is increased, the WAS administrating server manages the individual web servers and the individual WAS's included, respectively, in the first application service, the second application service, and the third application service, without an addition of a new WAS administrating server that manages a domain of the third application service.

6. The method of claim 1, further comprising a step of:
(c) the WAS administrating server detecting and managing change in at least some of connection states of the existing WAS's, new WAS's prepared as a result of the process of scaling-out, the existing web servers, and new web servers prepared as a result of the process of scaling-out, by the first service group and the second service group.

7. A WAS (Web Application Server) administrating server comprising:
a communication part for transmitting and receiving data to and from at least one web server and at least one WAS; and
a processor for performing processes of:
(I) while managing multiple WAS's and communicating with multiple web servers to allow at least one session for providing at least one application service to be shared, (i) grouping, as a first service group, both at least one first web server and at least one first WAS, which are connected with each other to provide a first application service, and (ii) grouping, as a second service group, both at least one second web server and at least one second WAS, which are connected with each other to provide a second application service, to thereby create at least two groups each of which includes at least its corresponding pair of web server and WAS, wherein the first WAS and the second WAS are selected among the multiple WAS's managed by the WAS administrating server and wherein the first web server and the second web server are selected among the multiple web servers communicating with the multiple WAS's, and
(II) allowing each of the grouped pairs of the web servers and the WAS's to be scaled out or scaled in, independently, by a process of scaling-out or scaling-in;
wherein, at the process of (I), on condition that the respective WAS's and the respective web servers that provide the individual application services are matched through their corresponding TCP connections, the processor groups the respective WAS's and the respective web servers by individual application services;
wherein, at the process of (II), the processor matches individual new web servers and individual new WAS's, prepared as a result of the process of scaling-out, by the individual application services through the individual TCP connections corresponding to the individual application services;
wherein, at the process of (I), the processor acquires names of the individual service groups from the individual WAS's and the individual web servers capable of providing the first application service and second application service, thereby grouping them as the first service group and the second service group, respectively; and
wherein, at the process of (II), the processor receives notifications from individual new web servers or individual new WAS's, prepared as a result of the process of scaling-out, of names of corresponding service groups of the individual new web servers or individual new WAS's, to thereby manage the individual new web servers or the individual new WAS's, respectively, in the first service group and the second service group and allow respective information to be shared only within the first application service group and the second application service group, respectively.

8. The WAS administrating server of claim 7, wherein, at the process of (I), the processor creates the at least two groups by applying grouping processes to at least part of all web servers and all WAS's managed by the WAS administrating server, by individual application services.

9. The WAS administrating server of claim 7, wherein, at the process of (II), if a process of scaling-out or scaling-in with respect to a specific group corresponding to a specific application service selected from either of the first application service and the second application service is required, the processor increases or reduces the number of at least some of WAS's and web servers in the specific group corresponding to the specific application service.

10. The WAS administrating server of claim 7, wherein, at the process of (II), the processor allows WAS's included in the first service group and those in the second service group to share their connection information with each other to thereby allow the session to be shared.

11. The WAS administrating server of claim 7, wherein, if at least one of conditions are met, wherein the conditions include: (i) a first condition that a third application service is added as a new application, (ii) a second condition that the number of existing web servers or the number of new web servers corresponding to the third application service is increased, and (iii) a third condition that the number of the existing WAS's or the number of the new WAS's corresponding to the third application service is increased, the WAS administrating server manages the individual web servers and the individual WAS's included, respectively, in the first application service, the second application service, and the third application service, without an addition of a new WAS administrating server that manages a domain of the third application service.

12. The WAS administrating server of claim 7, wherein, further comprising a process of:
(III) the processor detecting and managing change in at least some of connection states of the existing WAS's, new WAS's prepared as a result of the process of scaling-out, the existing web servers, and new web servers prepared as a result of the process of scaling-out, by the first service group and the second service group.

* * * * *